United States Patent
Ramisch

(10) Patent No.: US 8,683,953 B2
(45) Date of Patent: Apr. 1, 2014

(54) LITTER BOX FOR DOMESTIC ANIMALS

(76) Inventor: Jeferson Ramisch, Castelceriolo (IT)

(*) Notice: Subject to any disclaimer, the term of this patent is extended or adjusted under 35 U.S.C. 154(b) by 0 days.

(21) Appl. No.: 13/825,350

(22) PCT Filed: Sep. 22, 2011

(86) PCT No.: PCT/IB2011/054175
§ 371 (c)(1),
(2), (4) Date: Apr. 17, 2013

(87) PCT Pub. No.: WO2012/038920
PCT Pub. Date: Mar. 29, 2012

(65) Prior Publication Data
US 2013/0213310 A1      Aug. 22, 2013

(30) Foreign Application Priority Data
Sep. 24, 2010   (IT) ................ TO2010A0784

(51) Int. Cl.
*A01K 1/035*      (2006.01)
(52) U.S. Cl.
USPC .......................... 119/166; 119/165
(58) Field of Classification Search
USPC ................... 119/161, 165, 166, 170
See application file for complete search history.

(56) References Cited

U.S. PATENT DOCUMENTS

| | | | | |
|---|---|---|---|---|
| 3,111,932 A | * | 11/1963 | Knutson | 119/165 |
| 5,181,480 A | * | 1/1993 | Dabolt | 119/165 |
| 6,408,790 B1 | * | 6/2002 | Maguire | 119/166 |
| 6,662,748 B1 | * | 12/2003 | Hanks | 119/170 |
| 6,997,137 B1 | | 2/2006 | Ricke | |
| 8,408,160 B1 | * | 4/2013 | Pozin | 119/170 |
| 2006/0169214 A1 | * | 8/2006 | Turkalo | 119/165 |

FOREIGN PATENT DOCUMENTS

| | | | | |
|---|---|---|---|---|
| EP | 0 259 293 | | 3/1988 | |
| JP | 2002078428 A | * | 3/2002 | A01K 23/00 |
| JP | 2005185121 A | * | 7/2005 | A01K 23/00 |
| JP | 2011234680 A | * | 11/2011 | |

OTHER PUBLICATIONS

International Search Report and Written Opinion for PCT Application No. PCT/IB2011/054175 mailed Nov. 26, 2012.

* cited by examiner

*Primary Examiner* — Rob Swiatek
*Assistant Examiner* — Kathleen Alker
(74) *Attorney, Agent, or Firm* — RatnerPrestia

(57) ABSTRACT

A litter box for a domestic animal includes a box-like body equipped with an upper support wall that has a through opening, a container of a granular litter material susceptible to absorb the animal excrements, and a first tubular duct arranged below the upper wall, which is substantially extended between the upper wall and the bottom of the body, for conveying the animal excrements towards a discharge zone in the lower part of the body. The receptacle surrounds a second tubular duct inside the first tubular duct, whose upper end faces the opening and whose lower end faces the bottom of the body, and which defines an internal edge of the receptacle for the purpose of retaining a quantity of the granular material therein.

18 Claims, 8 Drawing Sheets

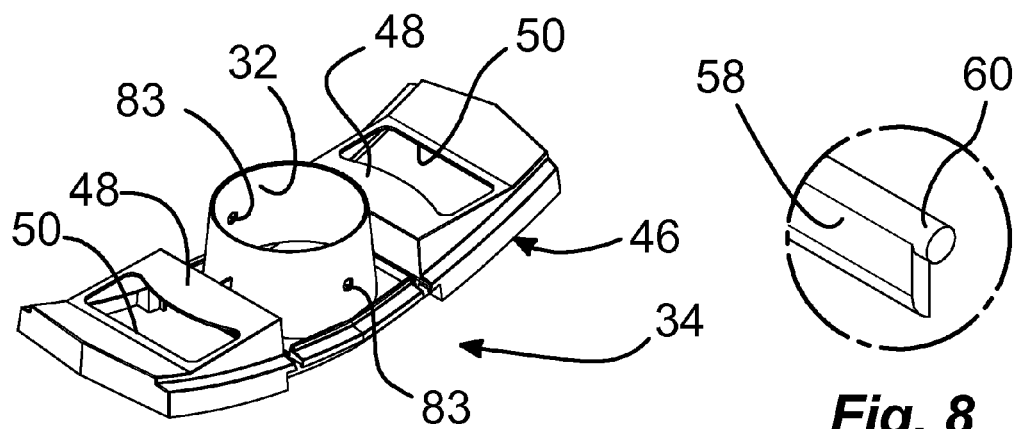
*Fig. 8*
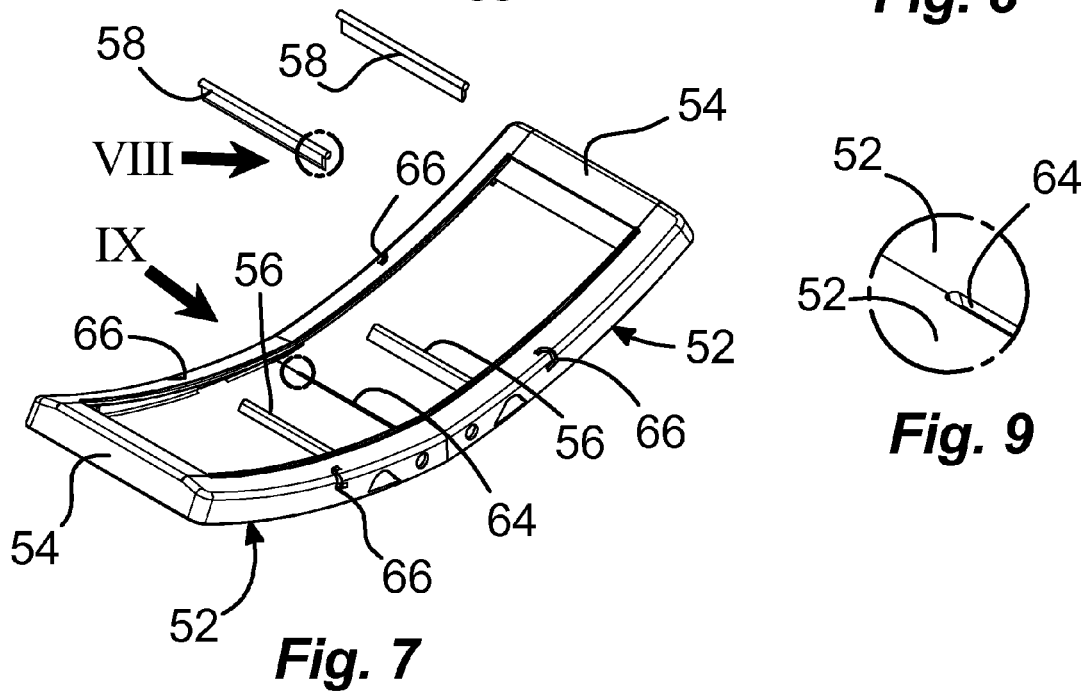
*Fig. 9*
*Fig. 7*
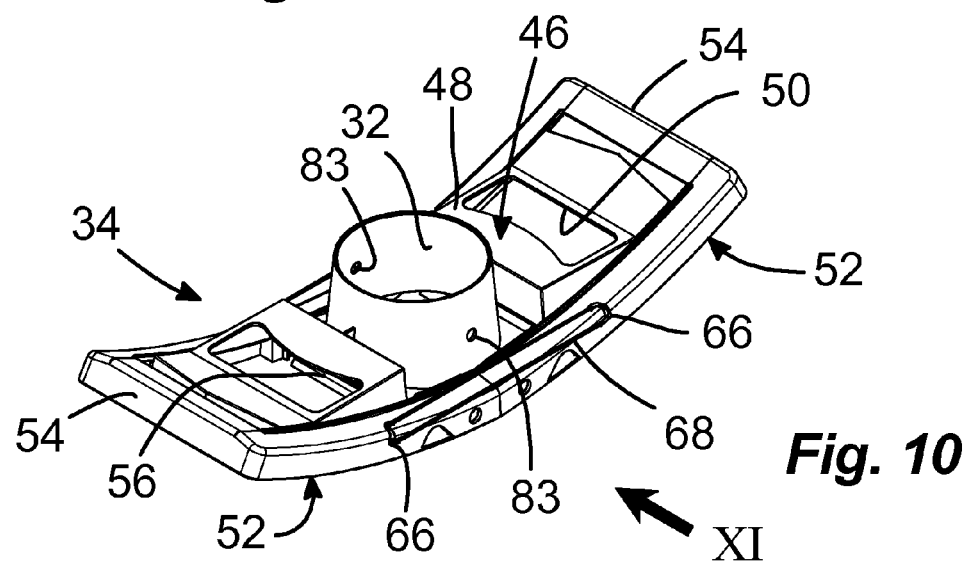
*Fig. 10*

LITTER BOX FOR DOMESTIC ANIMALS

CROSS REFERENCE TO RELATED APPLICATIONS

This application is the U.S. National Phase Application of PCT/IB2011/054175, filed Sep. 22, 2011, which claims priority to Italian Patent Application No. TO2010A000784, filed Sep. 24, 2010, the contents of such applications being incorporated by reference herein.

TECHNICAL FIELD OF THE INVENTION

The present invention refers to the hygienic boxes adapted to contain litter for domestic animals, particularly for cats, for the purpose of collecting the excrements of such animals. In particular, the invention regards a box-like body having an upper wall for supporting a domestic animal, means for containing a granular litter material susceptible to at least partially absorb the animal excrements, a first tubular duct arranged below the upper wall, for conveying the animal excrements towards a discharge zone arranged in the lower part of the body of the box.

PRIOR ART

A box of the abovementioned type is known from U.S. Pat. No. 6,997,137, which is incorporated by reference. It essentially comprises a box-like body equipped with an upper tray that defines a wall for supporting a domestic animal. This tray is mounted in an oscillatable manner with respect to the body and is intended to receive litter in the form of a granular material, intended to absorb the excrements of the animal. An oscillation of the tray, caused by an operator, causes the litter with the excrements associated thereto to fall through a tubular conveyor, reaching a container slidably mounted in the lower part of the body; such container can be extracted from the body of the box for the purpose of allowing the emptying thereof.

However, the box of this document has the drawback that, in the absence of external operator intervention, the excrements of the domestic animal remain at the upper surface level of the box in the aforesaid tray, and are therefore exposed to the outside environment. Consequently, this box does not result very hygienic, since on one hand it does not allow preventing new contact between the animal and the excrements without operator intervention, and on the other hand the excrements exposed to the outside environment can be a source of foul odors.

For the purpose of overcoming these drawbacks, a litter box of the type defined in the enclosed claims forms the object of the invention.

SUMMARY OF THE INVENTION

The invention draws inspiration from the observation of the fact that a domestic animal, after having defecated and if litter constituted by loose or granular material is present nearby, has the instinct to cover the excrements with such material. If the excrements can fall to a lower level with respect to the support surface of the animal, and if the material of the litter is arranged at an upper level with respect to the fallen excrement level, this material is used by the animal to cover the excrements on the top level, which allows substantially isolating them both from the support surface and from the outside environment; in such a manner, further contact of the animal with its excrements is prevented, as is the dispersion of foul odors into the surrounding environment.

Due to this solution idea, the box of the invention is highly effective during use since it allows the litter material not used by the animal to cover the excrements to remain uncontaminated; the box also has a simple structure that is inexpensive to produce.

In addition, the box also has the advantage that, even without an external operator intervention, e.g. over several days time, hygiene and foul odor problems do not arise.

According to a preferred characteristic of the invention, the upper wall of the box body has an upper abrasive surface.

Due to this characteristic, following use of the box, the nails of the animal are reduced via filing.

BRIEF DESCRIPTION OF THE DRAWINGS

Further characteristics and advantages of the invention will be clearer from the following detailed description, provided as a non-limiting example and referred to the enclosed drawings, in which:

FIG. 7 is an exploded perspective view of the main components of the valve device associated with the body of the box, FIGS. 8 and 9 are enlarged perspective views of details respectively indicated by the arrows VIII and IX in FIG. 7, FIG. 10 is a perspective view of the valve device of FIG. 7 in assembled condition.

DETAILED DESCRIPTION OF SEVERAL PREFERRED EMBODIMENTS OF THE INVENTION

Figure 1:
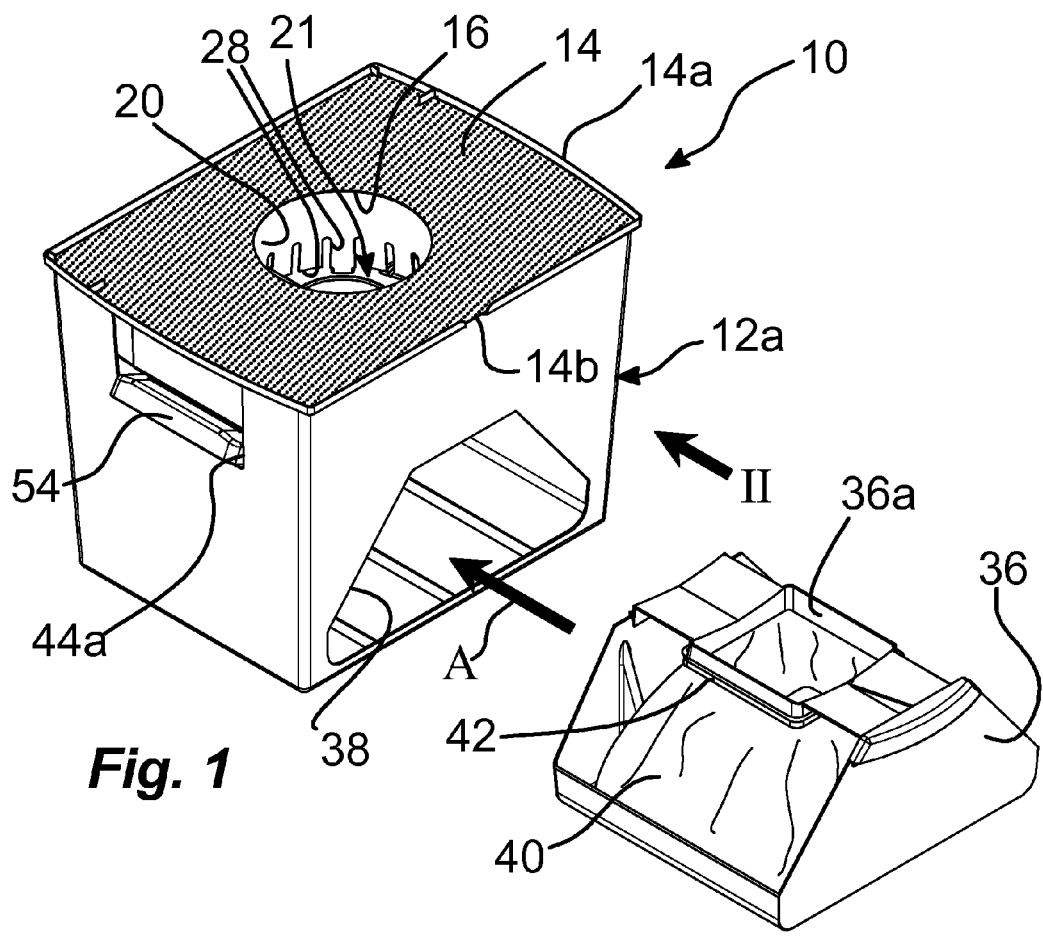
FIG. 1 is a perspective view of a first embodiment of a litter box according to the invention, provided with a collection drawer illustrated in its extracted position with respect to the body of the box.
Figure 2:
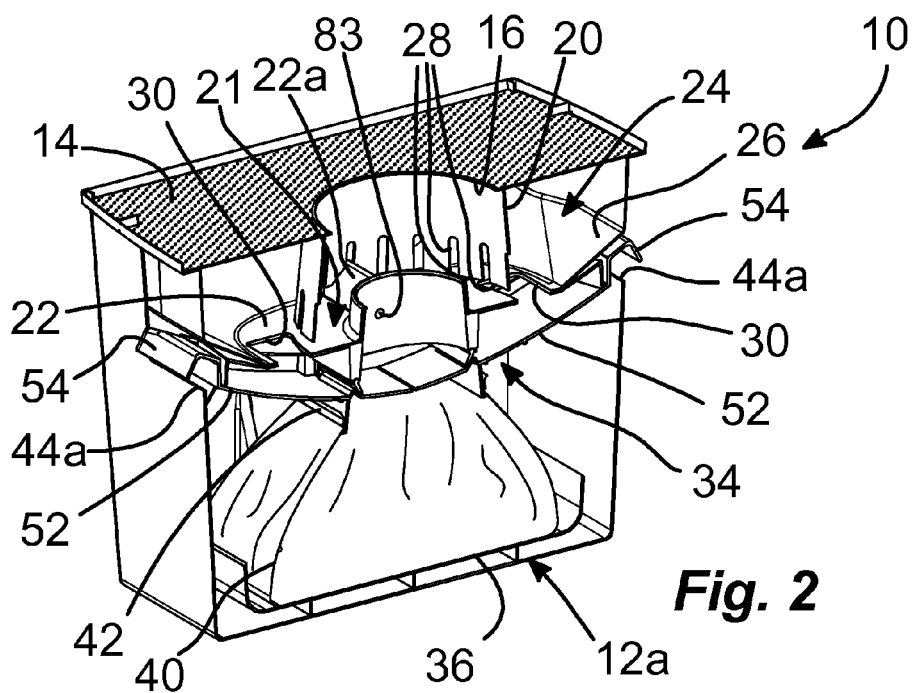
FIG. 2 is a perspective view of the body of the box of FIG. 1 from the side of the arrow II, sectioned along a vertical median plane.
Figure 3:
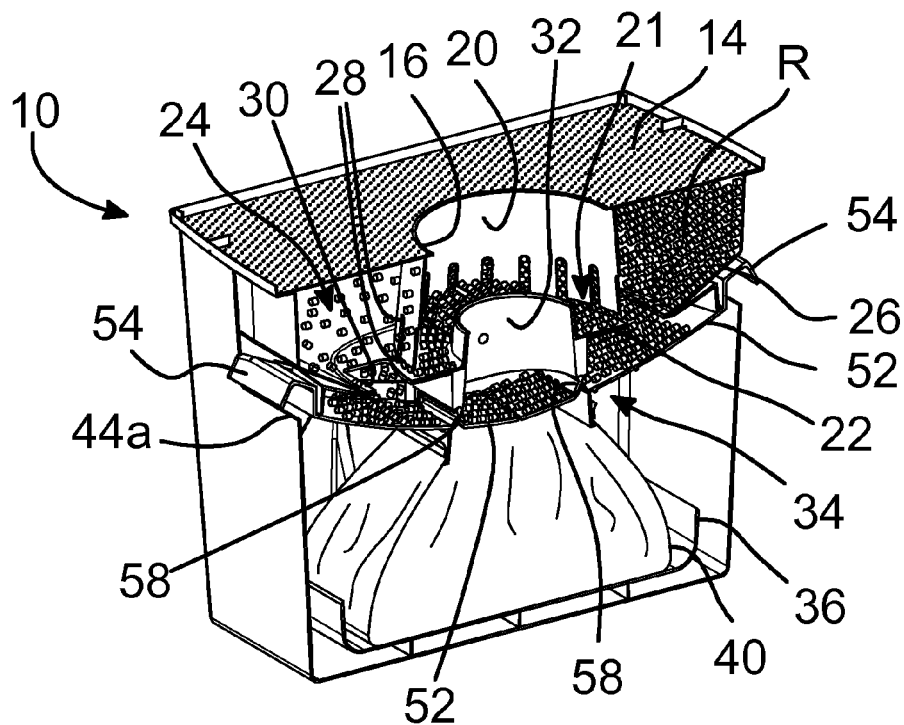
FIG. 3 is a view similar to that of FIG. 2, in which granular material litter is present inside the body of the box.

In the following figure, two embodiments are illustrated of a litter box for domestic animals, typically cats, generally indicated with 10, suitable for allowing the hygienic collection of animal excrements.

With initial reference to the box 10 of the first embodiment, illustrated in FIGS. 1 to 12, this comprises a body 12a with box-like shape, typically made of molded plastic material, whose upper wall 14 functions as an animal support surface.

The body 12a is preferably shaped as a parallelepiped with rectangular base, but any analogous form (e.g. cubic, cylindrical with circular base or elliptical) is equally possible.

Preferably, the wall 14 is advantageously removable, in order to allow accessing the interior of the body 12a from above. In particular, the wall 14 is surrounded by a perimeter edge 14a projecting upward, interrupted in 14b (FIG. 1) by a niche for allowing the lifting thereof (using a finger) with respect to the body 12a.

Alternatively, the wall 14 can comprise a removable portion for the same purpose. Said removable portion will preferably be the portion surrounding the opening 16, such that the width of said opening can be temporarily increased by removing said removable portion.

The upper surface of the wall 14 can be conveniently made with an abrasive material sheet, such as sandpaper or the like, in a manner so as to facilitate the filing of the nails of the animal when it moves along the surface 14.

In the wall 14, a through hole 16 is formed, generally arranged in a central position, for the purpose of allowing the animal excrements arranged on the wall 14 to fall towards the bottom of the body 12a. Said through opening 16 in the illustrated embodiment has a circular shape, but it is clear that it could have any other profile (e.g. elliptical or rectangular); analogously, it could also be obtained in an offset position with respect to the center of the wall 14.

The opening 16 faces a first tubular duct 20 with slightly conical form, whose upper end preferably has a diameter or profile slightly greater than the opening 16, in a manner such that the edge of the opening 16 projects inside the upper end of the duct 20.

The lower end of the duct 20 terminates close to an intermediate wall 22 of the body 12a, which delimits on the lower part a main tank 24 of a granular material R that constitutes the aforesaid "litter", closed on the upper part by the wall 14. The material R can be constituted by sand, expanded clay granules, pellets or by any similar loose material, for the purpose of at least partly absorbing the animal excrements.

The wall 22 in turn has a substantially central opening coaxial with the opening 16, delimited by a second tubular duct 32, preferably slightly conical and having a smaller cross section than that of the first duct 20. The duct 32 projects above the wall 22 inside the first duct 20, in a manner so as to define an annular receptacle 21 that surrounds the second duct 32.

Consequently, the second duct 32 is at least partly inside the first duct 20 and has an upper end facing the opening 16 and a lower end turned towards the bottom of the body 12a. In this manner, the opening 16, the first duct 20 and the second duct 32, which are vertically aligned, allow the excrements of an animal to fall towards the bottom of the body 12a.

In addition, the wall 22 at the receptacle 21 is conveniently provided with a pair of diametrically opposite reliefs 22a, with downward-diverging profile, which delimit a pair of semicircular zones of the receptacle 21.

At the lower end of the first duct 20, a series of radial openings 28 are formed which allow the communication between the tank 24 and the receptacle 21. In addition, the wall 22 has, a conical portion 26 that is extended around the receptacle 21, in a manner such that the material of the litter R present in the tank 24 tends to descend along the portion 26 of the wall 22 until it automatically fills the receptacle 21 via gravity, through the openings 28.

The upper end of the duct 32 projects above of the wall 22 and defines an internal edge of the receptacle 21 that prevents the accidental fall of the material R inside the duct 32.

In addition, the distance between the upper end of the second duct 32 and the opening 16 is such to allow an animal supported on the wall 14 to reach with a paw, through the opening 16, the material R present in the receptacle 21 in order to make it fall inside the duct 32, as will be explained hereinbelow in this description.

In the first embodiment illustrated in FIGS. 1 to 12, below the second duct 32 and the wall 22, a valve device is present, generally indicated with 34, intended to allow the selective communication between the lower portion of the second duct 32 and the bottom of the body 12a.

The valve device 34 comprises at least one plate shutter 52 mounted transversely and slidably below the second tubular duct 32 between a closed configuration and an open configuration, in which the closed configuration of the valve device 34 allows (substantially sealingly) isolating the animal excrements from the environment, preventing any dispersion of odors outside the box 10.

Preferably, the valve device 34 include two plate shutters 52 that are symmetrically slidable with respect to the body 12a, as illustrated in FIGS. 1 to 12, even though it is alternatively possible to provide for the presence of only one shutter 52.

The two shutters 52 are movable with respect to a support structure 46 fixed to the body 12a below the wall 22; the second tubular duct 32 is in turn fixed to the structure 46.

Preferably, the terminal end of each plate shutter 52 turned towards the center of the duct 32 has a frontal notch which, in the side-by-side configuration of the two shutters 52 corresponding to the closed configuration of the valve device 34, defines a slit 64 (FIGS. 7 and 9) between the two shutters 52; such slit 64 allows the fall of the liquid excrements towards the bottom body 12a even when the device 34 is in closed condition.

In diametrically opposite positions with respect to the duct 32, the structure 46 has a pair of upper elements 48 in which relative windows 50 are formed, opened upward; in the assembled condition of the structure 46 inside the body 12a, such windows 50 are arranged at windows 30 formed in the intermediate wall 22, for the purpose of allowing the communication of the main tank 24 also with the zone above the shutters 52 through the windows 30 and 50, in a manner such that the material R can reach the upper surface of the shutters 52.

The granular material R that reaches the shutters 52 through the windows 30 and 50 is stopped by a pair of transverse ribs 56 formed on the upper surface of each shutter 52 in a manner so as to upwardly project, and also by a pair of oscillatable tabs 58 rotatably mounted with respect to the structure 46. In particular, each tab 58 has a pair of end pins 60 (FIG. 8) for articulation to the structure 46, and a lower lip adapted to graze the upper surface of the relative shutter 52, for the purpose of scraping the material contaminated by the animal excrements, indicated in the figures with R1, present on top of the relative shutter 52; such scraping is carried out in order to move such material from a rib 56 towards the respective terminal end when the shutters 52 are open.

The oscillatable tabs 58 are preferably entirely or partly made of a flexible material, e.g. rubber, in a manner such that they naturally tend to return into initial position due to their elasticity.

Figure 4:
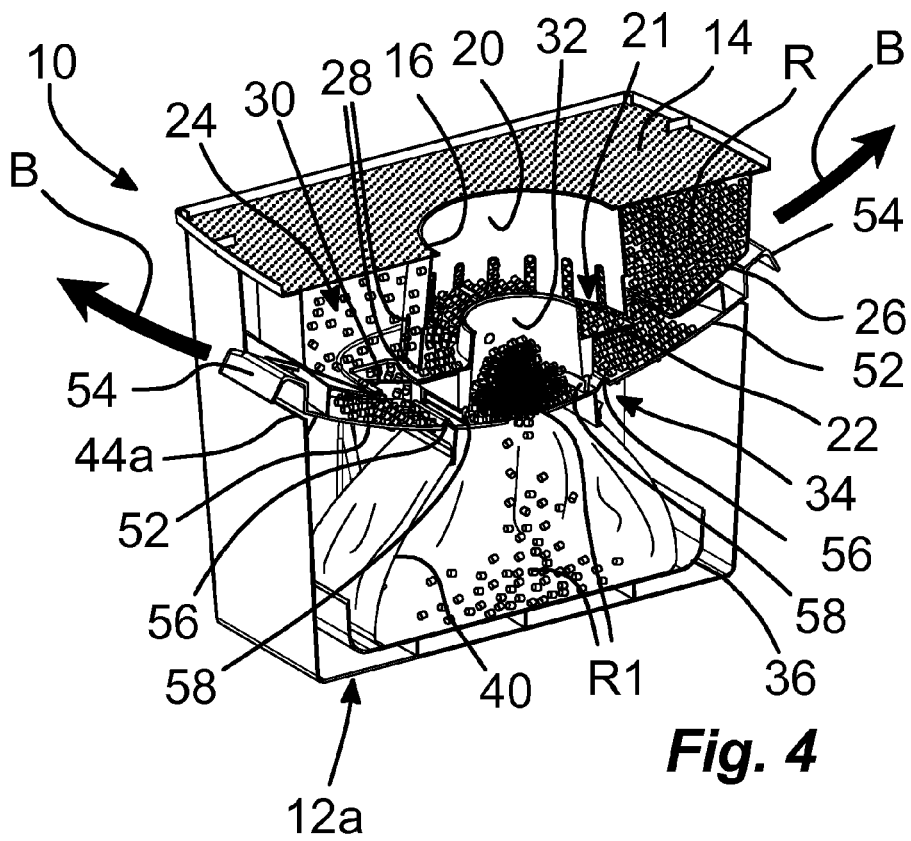
FIG. 4 is a view similar to that of FIG. 3, in which a valve device of the box, which has the function of allowing the animals excrements to fall, is in a partially open configuration.
Figure 5:
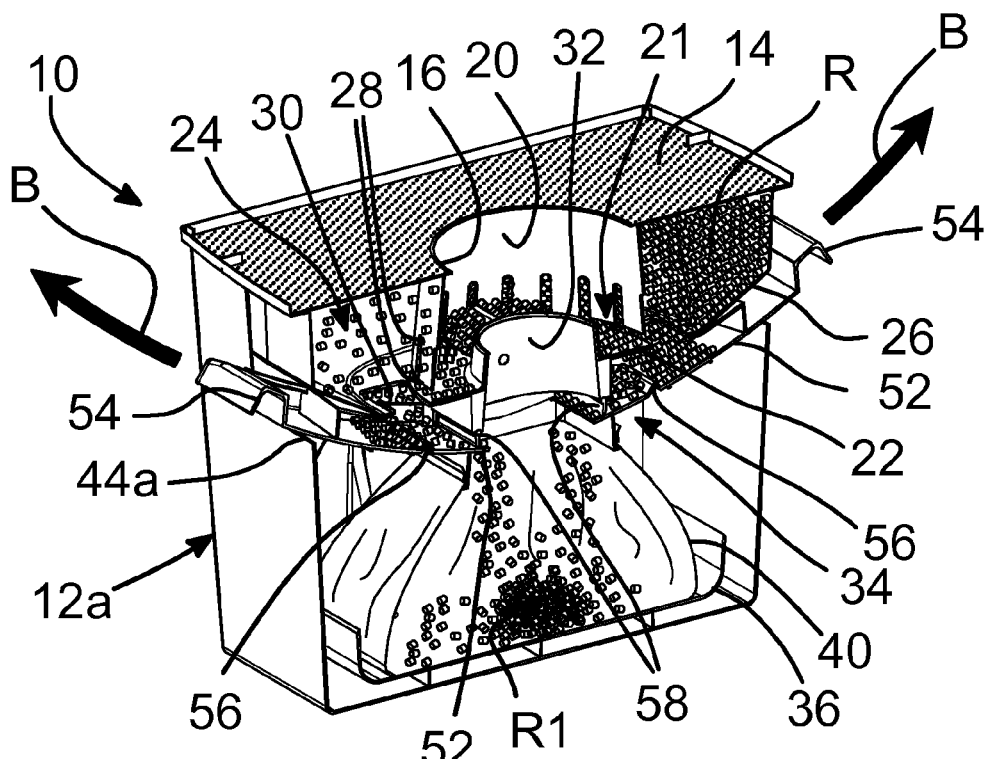
FIG. 5 is a view similar to that of FIG. 4, in which the valve device is in the completely open configuration.
Figure 6:
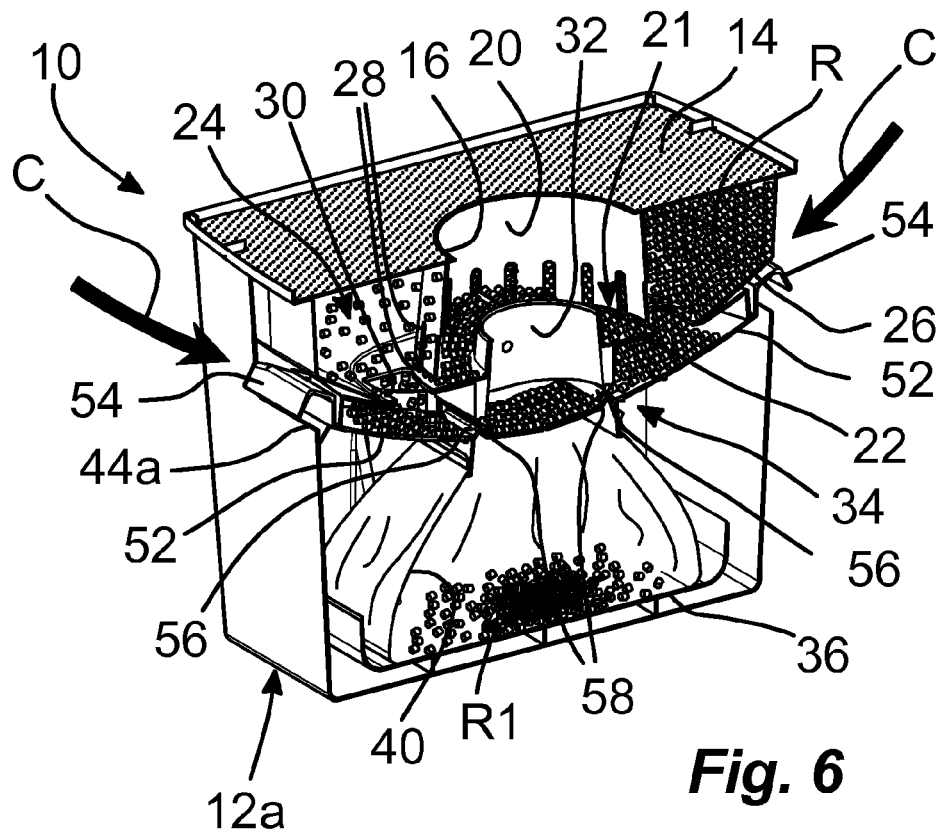
FIG. 6 is a view similar to that of FIG. 3, with the valve device in the closed configuration, attained after the opening thereof.
Figure 11:
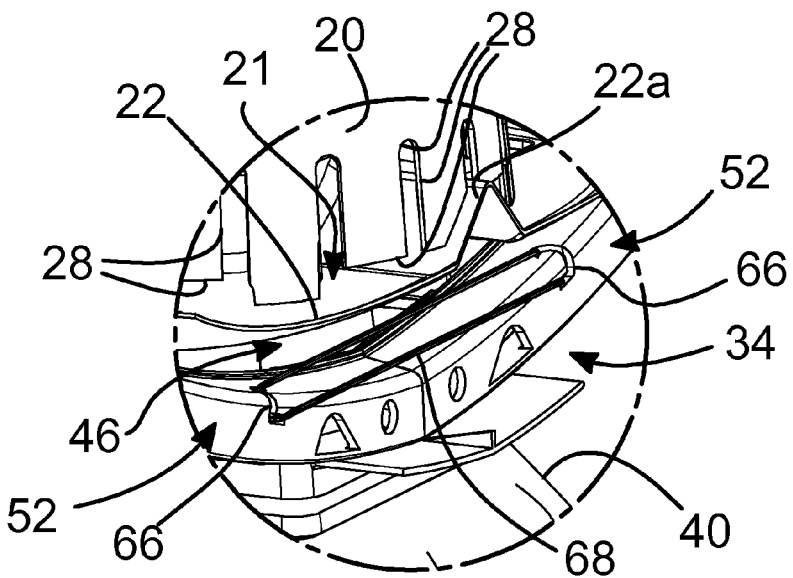
FIG. 11 is an enlarged perspective view of a detail indicated by the arrow XI in FIG. 10.

In addition, each plate shutter 52, on the side opposite the relative terminal end, has a handle 54 projecting outside the body 12a through a relative opening 44a, in a manner so as to allow an operator to grasp the handles 54 from outside the body 12a in order to cause the movement of the shutters 52 towards the open configuration of the valve means 34 (according to the arrows B of FIGS. 4 and 5).

After the shutters 52 have been brought into open position, for opening the passage constituted by the opening 16 and by the ducts 20 and 32 towards the bottom of the body 12a, they automatically return into side-by-side position (arrows C of FIG. 6) which corresponds to the closed configuration of the valve means 34; this occurs following the action of elastic return means, after an external stress has ceased. For such purpose, on both sides of each plate shutter 52, pockets 66 are formed for the insertion of portions of an elastic band 68 (FIGS. 10 and 11) or the ends of a spring. In order to facilitate the return of the shutters 52 of the valve group 34 into the closed configuration, an external thrust can also be applied on the handles 54.

According to a first embodiment variant, in order to allow the user to move the shutters 52 without having to use his hands, the handles 54 can be substituted by a pedal, which is connected by means of respective levers to both shutters 52. According to this variant, by pressing with one foot on the pedal and overcoming the resistance of elastic return means, it is possible to obtain the movement of the shutters 52 from the closed configuration to the open configuration; by then removing the foot from the pedal, the shutters 52 return to the closed configuration due to the abovementioned elastic return means. Preferably, the levers that connect the pedal to the shutters 52 are designed in a manner so as to obtain a synchronous movement of the two shutters from the closed configuration to the open configuration and vice versa.

Figure 12:
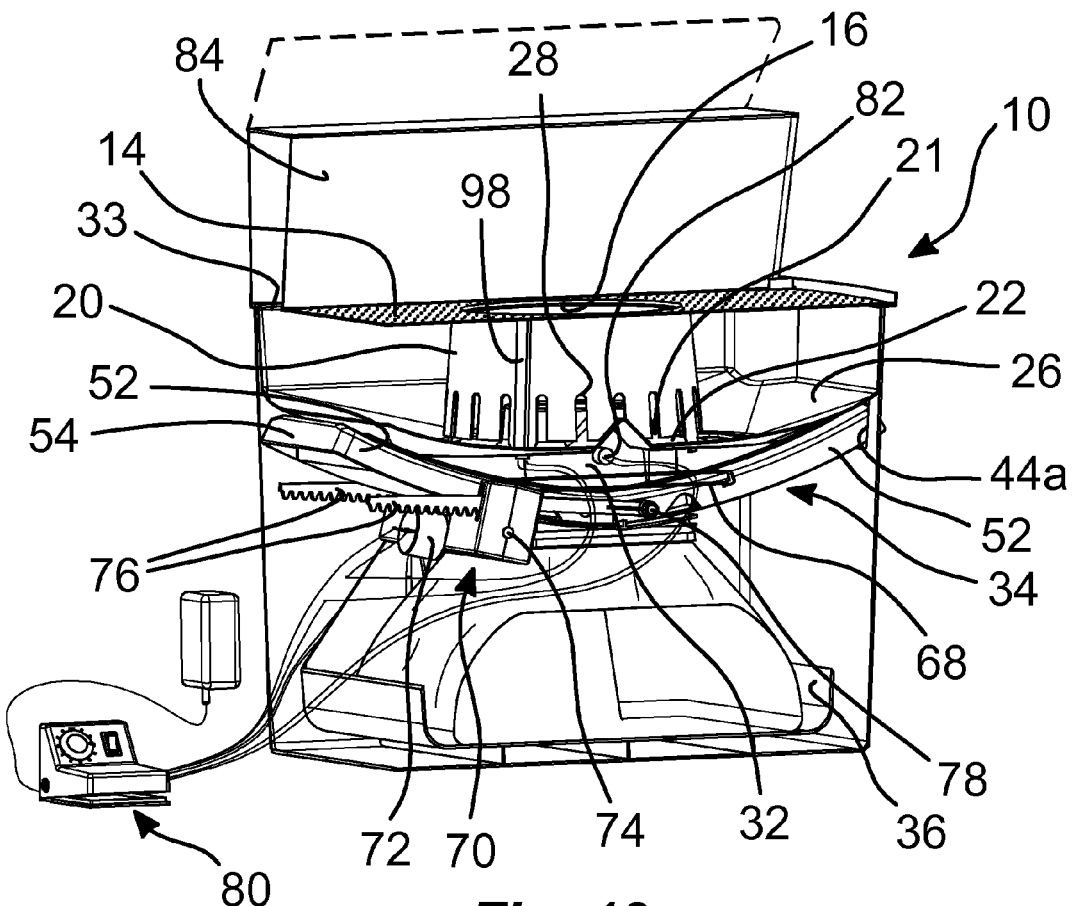
FIG. 12 is a schematic perspective view of a variant of the box of the first embodiment of the invention, equipped with a motorized group for actuating the valve device, and an auxiliary tank for the litter material.

According to a further variant of the present embodiment, schematically illustrated in FIG. 12, the box 10 can comprise motorized control means 70 for the opening of the valve means 34. In particular, such control means comprise an electric motor 72 which, by means of gear wheels (not illustrated), controls the rotation of a transverse shaft 74 that bears other gear wheels (also not illustrated) at the opposite ends for the meshing with respective rack formations formed on a pair of arms 76 articulated at 78 to at least one of the plate shutters 52. In addition, the movement of one of the shutters 52 determined by the rotation of the shaft 74 and by the consequent movement of the arms 76, can control the corresponding movement of the other shutter 52 following the mutual meshing via toothing (not illustrated in detail) of the two shutters 52. In this case, the return of the two shutters 52 into the closed position of the valve device 34 occurs via the reversal of the rotation of the motor 72, which can be automatically controlled, e.g. by means of an end stop return device.

The motor 72 can be driven by means of a button or pedal control device 80 associated with the exterior of the body 12a and/or it can be automatically driven. In the latter case, sensors 82 can be used for detecting the presence of excrements in the second duct 32 or on top of the shutters 52, inserted for example in seats 83 formed in the wall of the duct 32. Said sensors 82 can for example be laser sensors associated with a photocell, but any type of sensor adapted to detect the presence of excrements in the second duct 32 or on top of the shutters 52 is equally usable.

A presence sensor for detecting animal presence on top of the wall 14 can also be provided, for the purpose of preventing the activation of the motorized control means 70 when the animal is on top of the box 10. In the non-limiting example represented in FIG. 12, this presence sensor, indicated with 98, overall comprises a sprung rod slidably mounted with respect to the duct 20, whose upper end is in abutment against the lower face of the wall 14, and whose lower end is associated with a switch device. The switch device interrupts the supply of current to the motor 72 when the slidable rod is moved from its raised rest position, due to a small deformation of the wall 14 resulting from the weight of the animal thereon.

In addition, still with reference to the variant illustrated in FIG. 12, it may be possible to actuate the valve means 34 not only via motorized control means 70 but also manually. For such purpose, it is for example possible to provide that, overcoming the resistance of elastic means, one can disengage the gears that connect the electric control means 70 to the shutters 52, so as to be able to manually control the opening/closing of said shutters; the abovementioned elastic means will then bring the gears that connect the electric control means 70 to the shutters 52 back into the normal coupling configuration.

The box 10 can also comprise an auxiliary tank 84 of the granular material R, for example arranged along an upper edge of the body 12a and alongside the upper wall 14, which in this case is not as wide as the entire upper opening of the body 12a, whose bottom 33 is open in a manner such that the interior of the auxiliary tank 84 can communicate with the main tank 24.

This auxiliary tank can be equipped with an oscillatable upper cover (illustrated with dashed lines in FIG. 12) to allow the resupplying of the material R from above.

In the lower part of the body 12a, below the valve device 34, a removable collector 36 is arranged for allowing the collection of the animal excrements together with the contaminated granular material R1. This removable collector is preferably obtained by means of a drawer 36 slidably mounted with respect to the body 12a in the direction identified by the arrow A of FIG. 1, through an opening 38 made in a side wall thereof. Conveniently, the drawer 36 has an upper mouth 36a for allowing the removable fixing of an excrement collection bag 40, e.g. by means of a retaining band 42. The mouth 36a is shaped in a manner so as to obtain a seal closure between the opening of the bag 40, fixed by means of the band 42, and the lower surface of the actuators 52, in order to limit the dispersion of odors into the outside environment as much as possible.

Figure 19:
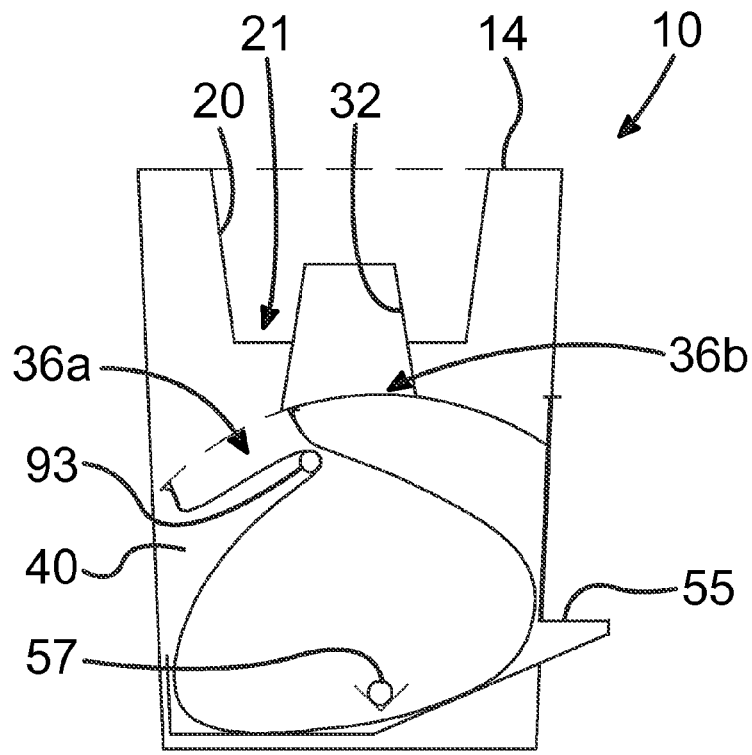
FIG. 19 is a schematic section view of a further variant of the box of the first embodiment of the invention, illustrated with the removable excrement collector in a first position.
Figure 20:
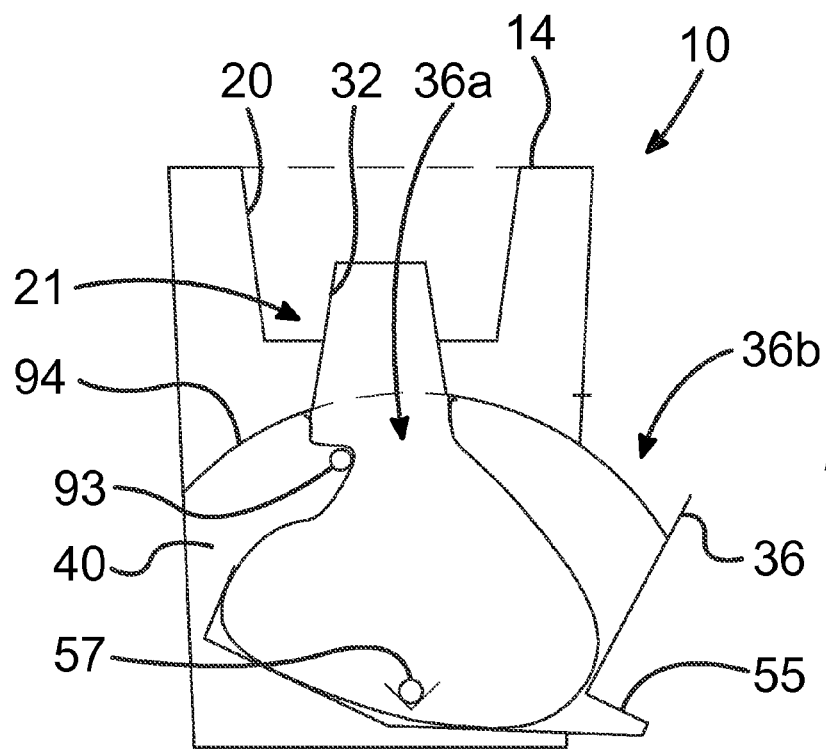
FIG. 20 is a schematic section view of the variant of FIG. 19 of the box of the first embodiment of the invention, illustrated with the removable excrement collector in a second position.

In a simplified variant of the above-described embodiment, illustrated in FIGS. 19 and 20, rather than use valve devices for allowing/preventing the fall of the excrements towards the bottom of the body 12a of the box 10, it is possible to provide for designing the removable excrement collector 36 in a manner such that it can carry out such function itself.

In particular, the removable collector 36 is designed in a manner such that it can be made to pass from a first position (illustrated in FIG. 19), in which the mouth 36a is not aligned with the lower edge of the second tubular duct 32 and the upper wall 36b of the drawer 36 maintains the lower end of said second tubular duct 32 closed, to a second position (illustrated in FIG. 20) in which the mouth 36a is aligned with the lower edge of the second tubular duct 32, so as to allow the downward fall of the excrements inside the bag 40 contained inside the collector 36.

Any means of known type can be used for making said drawer pass from said first to said second position. With reference to FIGS. 19 and 20, the collector 36 can be provided tilting around an axis 57 and obtained integral with a pedal 55: at rest, the drawer is situated in the first position of FIG. 19 and the excrements lie on the wall 36b of the collector 36, since they cannot fall further downward; by exerting sufficient pressure on the pedal 55, it is possible to make the collector 36 tilt into the second position of FIG. 20, with the mouth 36a aligned with the second tubular duct 32 and the excrements free to fall into the underlying bag 40.

Advantageously, in said second position, said bag 40 contained in the collector 36 is accessible from the outside, in a manner such that it can be removed and substituted as required.

Clearly, even in this simplified variant, it is possible to provide for seal closure means 93,94 between the collector 36 and the surrounding environment, in a manner so as to contain the foul odors.

In order to prevent the accidental dispersion of granular material R outside the box 10, the latter may also comprise, in a per se known manner, an upper cover (not illustrated) that can be coupled to the body 12a and provided with an opening for allowing the animal to access the upper wall 14 of the box 10. Still according to the prior art, said upper cover can advantageously be provided with a handle for facilitating the transport of the box 10.

In the functioning of the box 10, when an animal reaches the upper wall 14, it is autonomously positioned with respect to the opening 16. In the use of the box 10, the movements of the animal on the wall 14 automatically cause a reduction of the animal nails, due to the abrasive surface of such wall.

The receptacle 21 is filled with the clean granular material R that is fed via gravity from the tank 24.

The excrements produced by the animal fall through the opening 16, the first duct 20 and the second duct 32, until the upper surface of the shutters 52 is reached, in the side-by-side condition. While the liquid excrements can freely reach the bottom of the bag 40 associated with the drawer 36, through the slit 64, the solid excrements are stopped on top of the shutters 52. The animal, who has the instinct to cover the excrements with the granular material R, reaches the clean material R present in the receptacle 21 with a paw, and causes the fall of the material inside the duct 32, until the excrements are covered and substantially isolated from the outside environment.

The initial level of material R in the receptacle 21 is automatically restored via falling due to gravity, starting from the tank 24. The capacity of the duct 32 is such to receive a plurality of animal excrements, respectively covered by the material R.

The opening of the valve device 34, caused by an operator who manually operates on the handles 54 or on the button or pedal control device 80, causes the fall of the solid excrements together with the contaminated granular material R1 into the bag 40. The removal of the bag 40 and its substitution with a new bag allows eliminating the excrements from the litter 10.

During the step of sliding of the shutters 52 in the valve device 34 opening direction, the combined action of the ribs 56 of the shutters 52 and the oscillatable tabs 58 allows maintaining the clean material R separated from the contaminated material R1.

In addition, upon the return of the device 34 into its closed condition, due to the rotation of the tabs 58, a small quantity of clean material R can reach the terminal portions of the shutters 52 in order to form a thin bed of clean material R on top of the shutters 52 at the bottom of the second duct 32.

When the motorized control means 70 of the valve device 34 are present together with the sensor means 82, the sensors 82 allow detecting the attainment of a predetermined level of excrements and contaminated granular material R1, in order to cause the automatic opening of the valve device 34.

At the end of the step of opening the valve device 34, this once again assumes the closed condition, with the shutters 52 side-by-side, following the action of the motor 72.

It is observed that, in the case of animals who are accustomed to litter boxes of conventional type, a brief initial training period may be necessary.

During such period, the presence of the raised perimeter edge 14a advantageously allows covering the upper wall 14 with a thin layer of granular material R, in order to render the box 10 more familiar to the animal.

It is also possible during the initial training period to remove the sheet of abrasive material from the upper wall 14, or to overturn said upper wall 14 in a manner such that the smooth face remains upwardly exposed.

In FIGS. 13 to 18, a second embodiment is illustrated of the litter box according to the invention, in a simplified version.

In these figures, reference numbers analogous to those used for the preceding embodiment were employed for indicating equivalent or similar parts.

The box 10 of the second embodiment comprises a body 12b with box-like shape, it too normally obtained with molded plastic material, whose upper wall 14, which is fixed or removable with respect to the body 12b, carries out the function of support surface for an animal and is conveniently provided with an abrasive upper surface.

The first tubular duct 20 is connected to the side walls of the body 12b, or to the upper wall 14. Such duct 20 terminates, below the wall 14, with a circular surface 22 that defines the receptacle 21 on the lower part, conveniently provided with a pair of diametrical reliefs 22a. The internal edge of the receptacle 21 is delimited by an upwardly-projecting portion of the second tubular duct 32, which is extended coaxial with the first duct 20 and is preferably integrally formed with the first duct 20 and with the wall 22, i.e. with the receptacle 21.

The body 12b can be abutted against a surface 11, for example a floor, with a removable collector 37 superimposed, such as a paper or plastic plate, for collecting the animal excrements that fall through the opening 16, the duct 20 and the duct 32.

On a pair of opposite side walls of the body 12b, a pair of slits 43 are made for the click-fit insertion of hinging members of a pair of extractable legs 47, each of which comprising a pair of uprights 47a connected by a relative crossbar 47b. These hinging members comprise pin appendages 45 which are extended from the upper end of the uprights 47a and whose length is slightly greater than the width of the slits 43, in order to allow their click-fit insertion in the slits 43.

The extractible legs 47, after a rotation around the respective hinging points caused by gravity, are extended below the body 12b in a manner so as to allow the body 12b to assume a raised configuration with respect to the floor 11, in order to facilitate the removal of the collector 37 with the animal excrements. For such purpose, at opposite sides of the body 12b, on the side of each leg 47, niches 44b are formed that function as handles in order to allow an operator to manually grasp the body 12b and raise it, in a manner so as to allow the downward extension of the legs 47.

The legs 47 preferably have click-fit anchorage means in their extracted configuration, e.g. constituted by tongues 49 that are extended from a portion of the uprights 47a of the legs 47, intended to be click-fit coupled at a zone of the lower edge of the body 12b.

Figure 13:
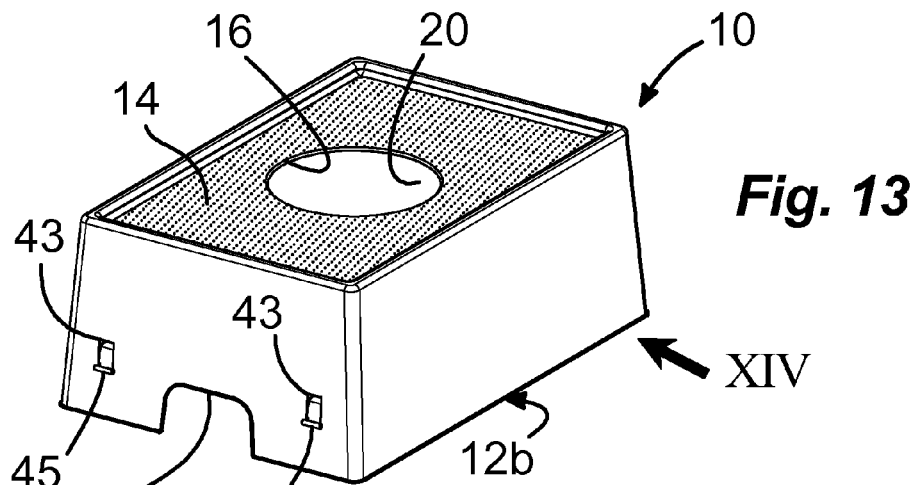
FIG. 13 is a perspective view of a second embodiment of a box of the invention, whose body is in the rest position abutted against a support surface.
Figure 14:
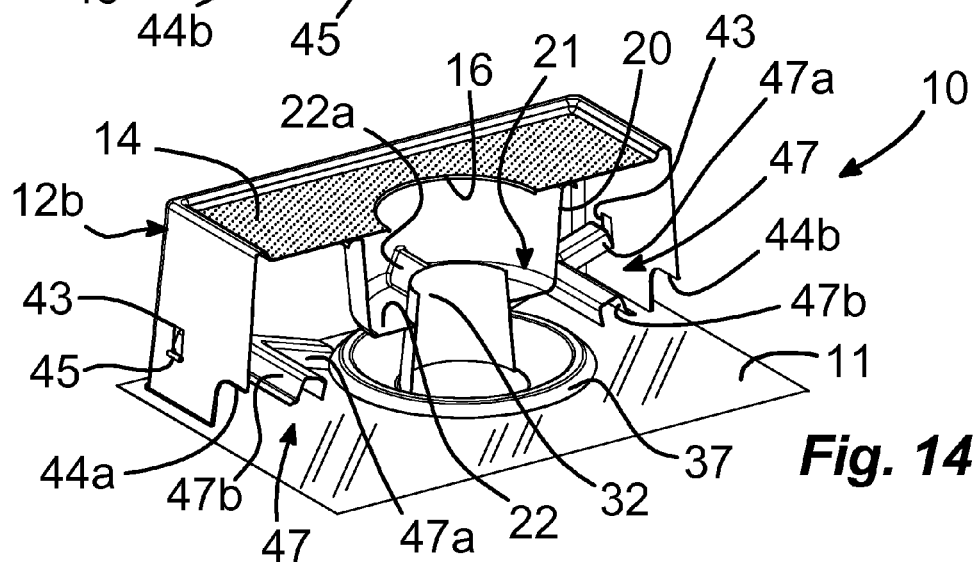
FIG. 14 is a perspective view of the box of FIG. 13 from the side of the arrow XIV, sectioned along a vertical median plane.
Figure 15:
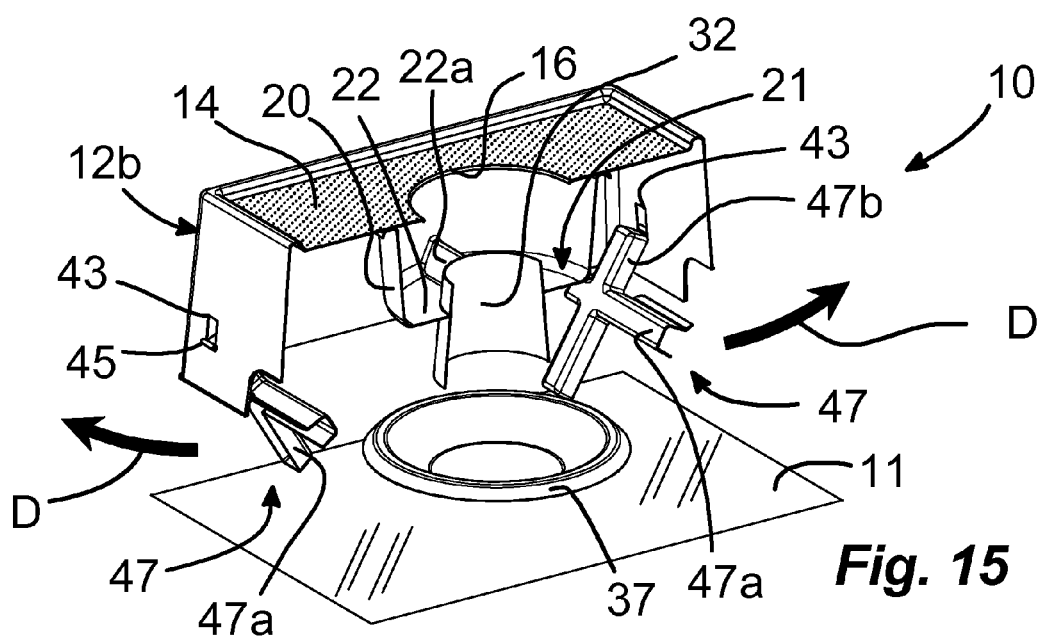
FIG. 15 is a view similar to that of FIG. 14, in which the body of the box is partially raised with respect to the support surface.
Figure 16:
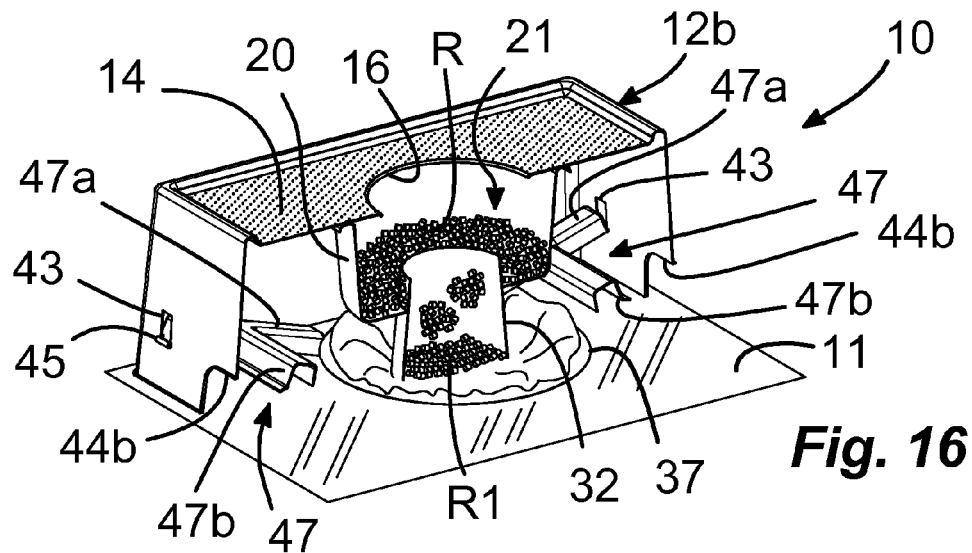
FIG. 16 is a view similar to that of FIG. 14, in which inside the body of the box, litter is present constituted by a granular material.
Figure 17:
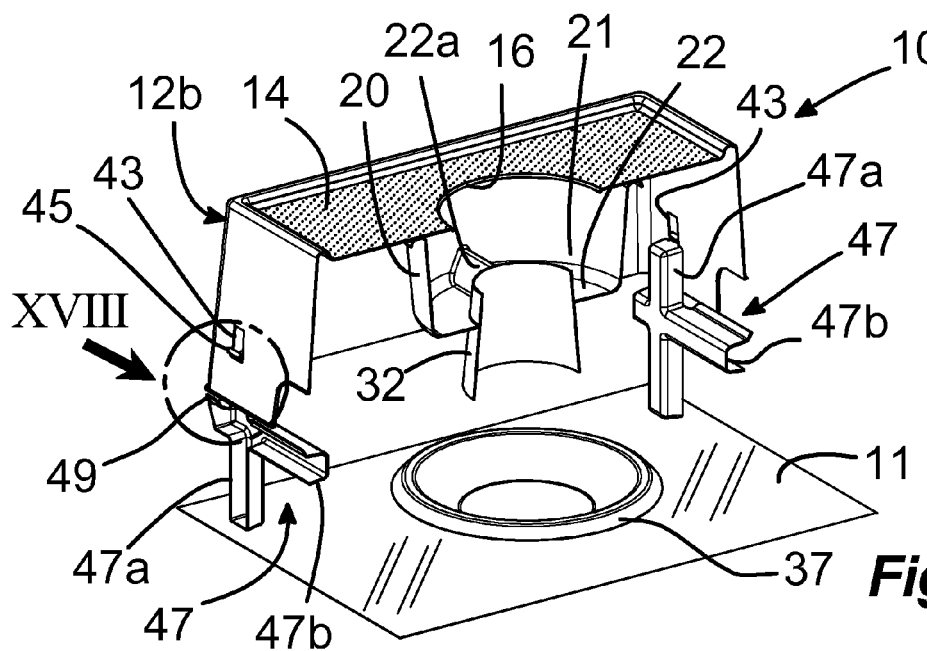
FIG. 17 is a view similar to that of FIG. 15, in which the body of the box is spaced from the support surface and supported by extractable support legs.
Figure 18:
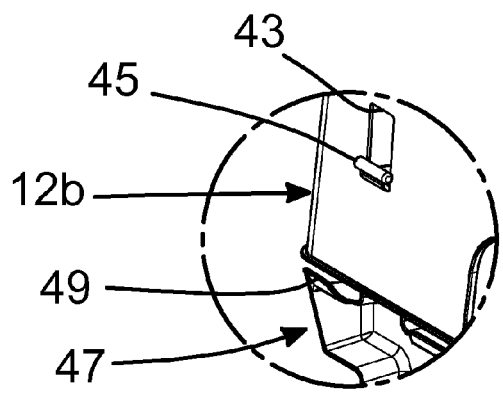
FIG. 18 is an enlarged perspective view of a detail indicated by the arrow XVIII of FIG. 17.

In order to bring the legs 47 back into the retracted position illustrated in FIGS. 13, 14 and 16, the operator raises the body 12b slightly and exerts a pressure on the crossbar 47b of the legs 47 via a finger through the niches 44b, in a manner so as to cause the disengagement of the tongues 49 from the lower edge of the body 12b, in order to allow the free rotation of the legs 47.

In this embodiment, the receptacle 21 is previously filled with the granular material R, for example through the opening 16 or, if provided, by raising the wall 14. The functioning of the box 10 is then entirely similar to that described for the previous embodiment, with the main difference that no valve device is provided below the tubular duct 32.

In particular, the animal that uses the box 10, after having produced the excrements at the opening 16 of the wall 14, will follow his instinct to cover the excrements with the granular material R present in the receptacle 21; with a paw, he will cause the fall of clean material R on top of the excrements that fell, through the ducts 20 and 32, onto the collector 37 arranged at the bottom of the body 12b.

It is clear from that described and illustrated that the present invention allows attaining the objects pre-established, since it provides a litter box that results, from many standpoints, more hygienic than conventional litters; in particular, with this invention, the excrements do not remain attached to the paws of the domestic animal, nor do they not remain exposed to the outside environment, the foul odors are eliminated or in any case considerably reduced, and so forth.

It is also clear that that described and illustrated was given as a non-limiting example, and that numerous variants and modifications are possible without departing from the protective scope of the invention as defined by the claims set.

In particular, the shape of the body, of the opening in the upper wall of said body, of the tubular ducts and the excrement collector can be selected as desired according to the specific requirements, as can the materials used for obtaining the components of the box.

In addition, even if in the illustrated embodiments the upper wall of the box has a single opening, it is also possible to provide for the obtainment of a box with large-size body whose upper wall has multiple openings, each of which equipped with a corresponding excrement drop system of the type described above and in particular comprising a first and a second tubular duct, a receptacle and a collector for the excrements and the contaminated granular material. Such solution could be advantageous in situations where many animals are present, e.g. mountain huts, cat colonies, etcetera.

Alternatively, still for this application type, coupling means could be obtained on the side walls of the box body, in a manner such that multiple boxes can be connected together.

The invention claimed is:

1. A litter box for domestic animals for use with a granular litter material, the litter box comprising:
   a box-like body having an upper wall for supporting a domestic animal,
   a receptacle for containing the granular litter material susceptible to at least partially absorb animal excrements,
   a first tubular duct arranged below the upper wall, for conveying the animal excrements towards a discharge zone arranged in a lower part of the body of the box,
   wherein said upper wall has a through opening facing the first tubular duct, and in that the first tubular duct is substantially extended between said opening and the receptacle of the granular material interposed between the upper wall and a bottom of the body, and said receptacle surrounds a second tubular duct with smaller cross section than the first tubular duct, arranged inside the first tubular duct and having an upper end facing the opening of the upper wall of the body and a lower end facing the bottom of the body, and said second tubular duct allows the fall of the animal excrements towards the bottom of the body and defines an internal edge of the receptacle for the purpose of retaining therein a quantity of said granular material, so as receptacle being placed at a distance from said opening such to allow an animal set on the upper wall to reach, through said opening, the granular material present therein.

2. The litter box as claimed in claim 1, wherein the upper wall of the body has an abrasive upper surface.

3. The litter box as claimed in claim 1, wherein the upper wall of the body is removable.

4. The litter box as claimed in claim 1, further comprising a valve device arranged below the second tubular duct, in order to selectively allow a communication between a lower portion of the second tubular duct and the bottom of the body.

5. The litter box as claimed in claim 4, further comprising a main tank interposed between said upper wall and said valve device, and in communication at least with said receptacle, in a manner such that the receptacle is automatically resupplied with the granular material starting from said main tank.

6. The litter box as claimed in claim 4, wherein said valve device comprises at least one plate shutter slidably mounted transverse to the second tubular duct, between a closed configuration and an open configuration.

7. The litter box as claimed in claim 4, wherein the valve device comprises an oscillatable tab associated with the upper surface of each plate shutter, rotatably mounted around an axis transverse to the relative plate shutter, functioning as a scraping element of the granular material contaminated by the excrements and present above said plate shutter.

8. The litter box as claimed in claim 7, wherein the upper surface of each plate shutter has a transverse rib which cooperates together with the relative tab in order to keep the clean granular material separate from the granular material contaminated by the excrements on top of each plate shutter.

9. The litter box as claimed in claim 6, wherein said at least one plate shutter comprises a handle that can be grasped by an operator from outside the body for the purpose of allowing a manual movement of the shutter towards the open or closed configuration of the valve means.

10. The litter box according to claim 9, wherein said at least one plate shutter is biased towards the closed configuration of the valve means by elastic return means.

11. The litter box as claimed in claim 6, wherein said at least one plate shutter comprises a pedal connected to said at least one plate shutter by means of levers, for the purpose of allowing the movement towards the open or closed configuration of the valve means by exerting pressure on said pedal.

12. The litter box as claimed in claim 6, further comprising motorized control means adapted to move said at least one plate shutter verso the open or closed configuration of the valve device.

13. The litter box as claimed in claim 12, wherein the activation of the motorized control means is controlled by sensor means that detect the presence of excrements associated with the second tubular duct.

14. The litter box as claimed in claim 1, wherein the body is associated with a removable excrement collector that includes a drawer slidably mounted with respect to the body.

15. The litter box as claimed in claim 14, wherein said collector comprises a mouth for placing said second tubular duct in communication with said removable excrement collector.

16. The litter box as claimed in claim 15, wherein said mouth of said collector and shutters form seal closure means adapted to prevent the dispersion of odors into the outside environment.

17. The litter box as claimed in claim 15, wherein said collector is movable between a position in which said mouth is aligned with said second tubular duct and a position in which said mouth is not aligned with said second tubular duct.

18. The litter box as claimed in claim 1, wherein the body is associated with extractable legs adapted to allow bringing the body into a raised configuration, for the purpose of facilitating the removal of the animal excrements from a discharge zone at the bottom of the body, said legs being articulated to the body and having click-fit anchorage means with respect to the body, in an extracted configuration.

* * * * *

UNITED STATES PATENT AND TRADEMARK OFFICE
CERTIFICATE OF CORRECTION

PATENT NO. : 8,683,953 B2            Page 1 of 1
APPLICATION NO. : 13/825350
DATED : April 1, 2014
INVENTOR(S) : Ramisch It is certified that error appears in the above-identified patent and that said Letters Patent is hereby corrected as shown below:

On the Title Page, Item [30], FOREIGN APPLICATION PRIORITY DATA: TO2010A0784 should read -- TO2010A000784 --

Signed and Sealed this
Twenty-fourth Day of June, 2014

Michelle K. Lee
*Deputy Director of the United States Patent and Trademark Office*